Sept. 12, 1950 H. J. FRAMHEIN 2,522,357
LIFT TRUCK

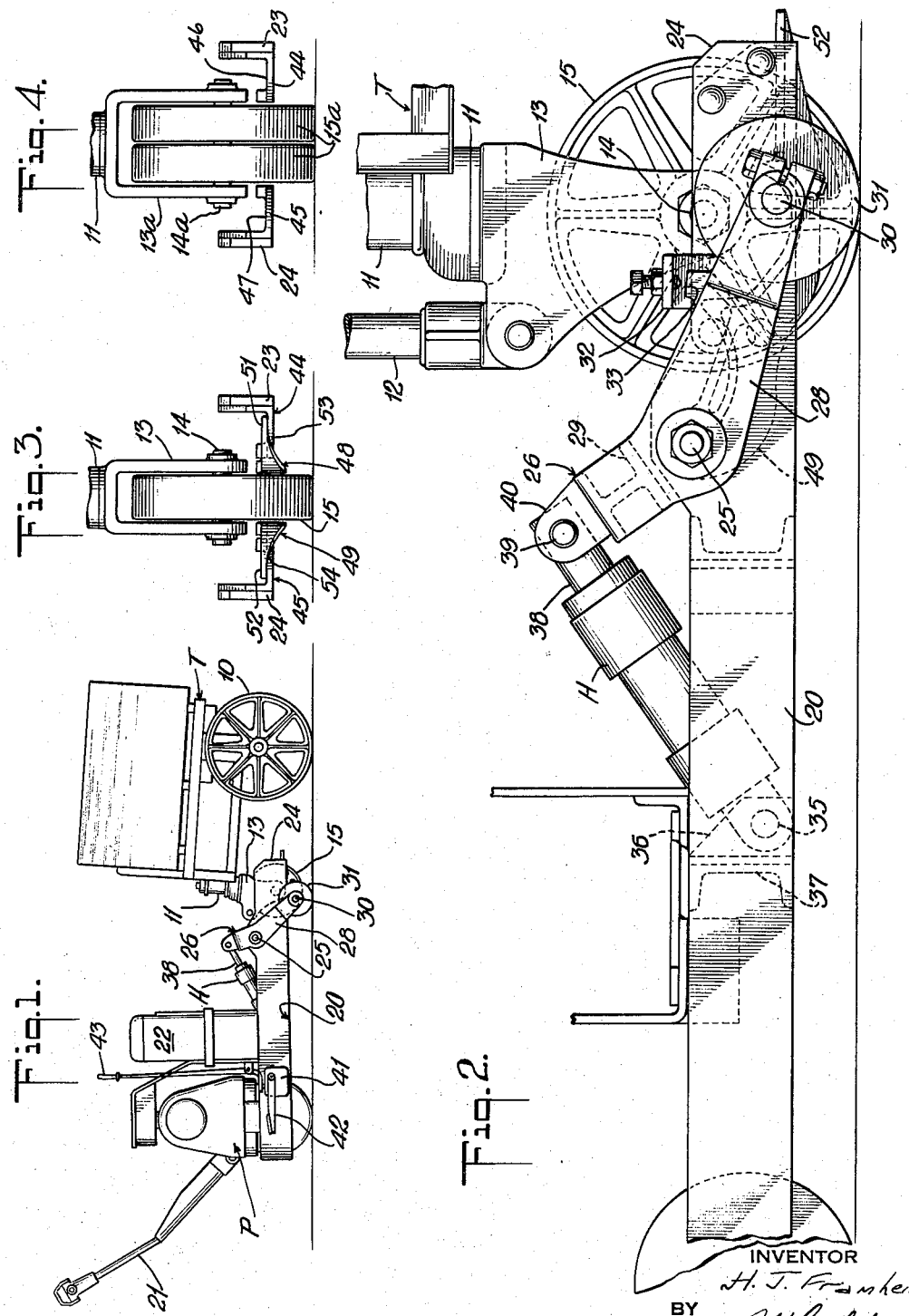

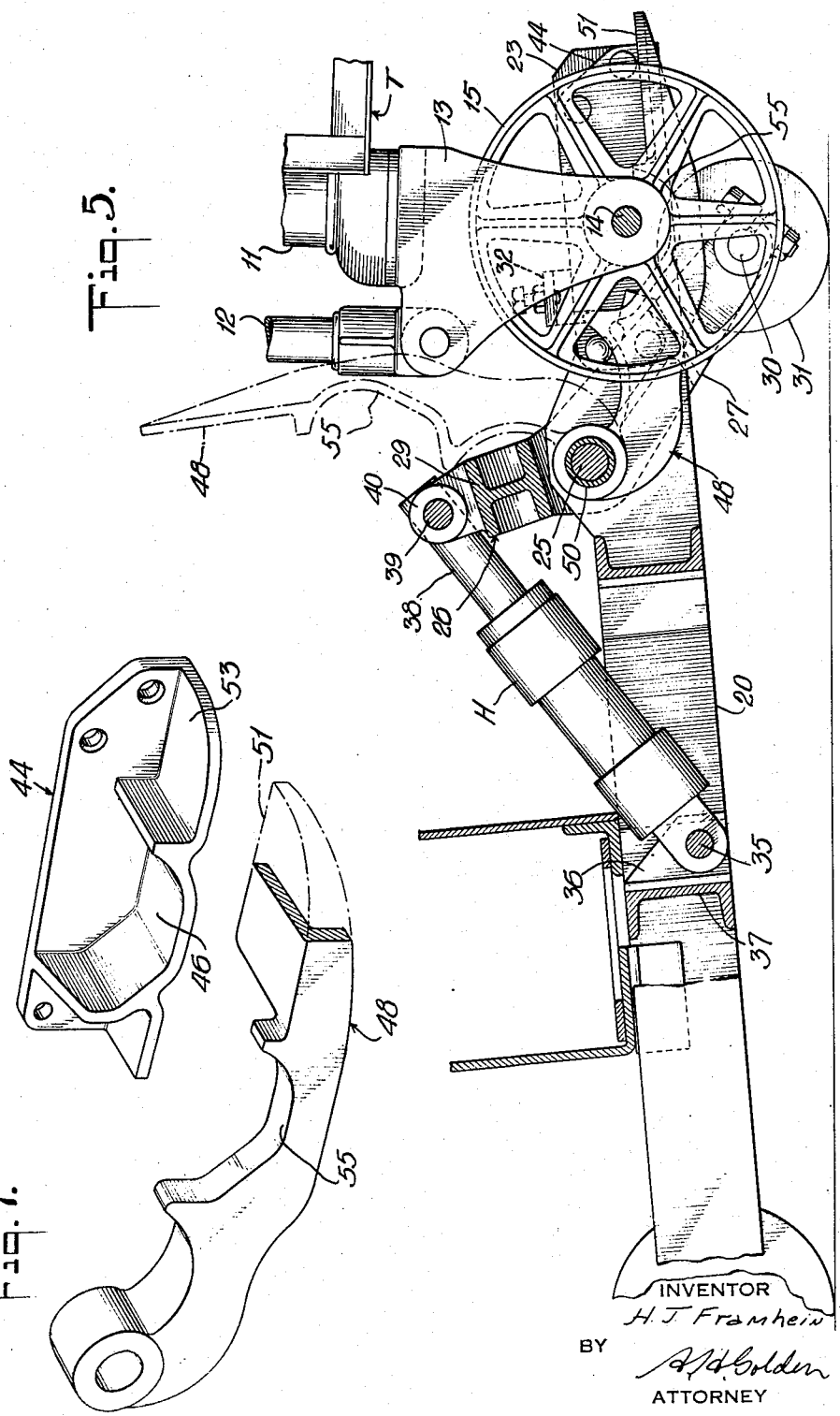
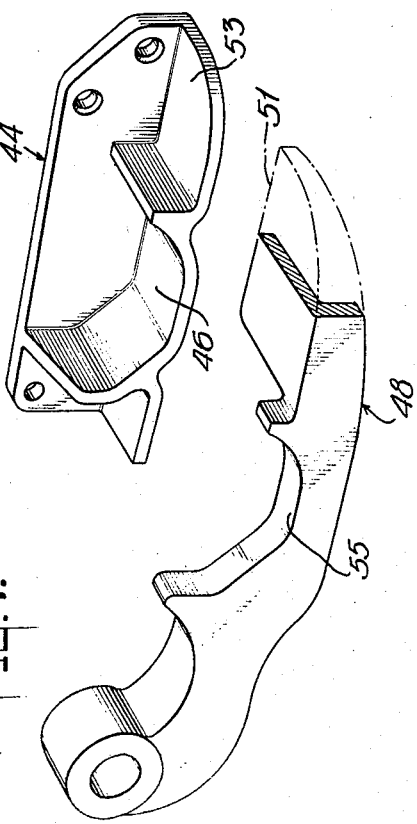

Filed April 26, 1946 3 Sheets-Sheet 3

INVENTOR
H. J. Framhein
BY
H. H. Golden
ATTORNEY

Patented Sept. 12, 1950

2,522,357

UNITED STATES PATENT OFFICE 2,522,357

LIFT TRUCK

Herbert J. Framhein, Chicago, Ill., assignor to The Yale & Towne Manufacturing Company, Stamford, Conn., a corporation of Connecticut Application April 26, 1946, Serial No. 665,277

13 Claims. (Cl. 280—44)

This invention relates to an industrial truck, and more particularly to an industrial truck adapted for lifting one end of a trailer or the like, whereby to move the trailer and the load thereon.

It is the object of my invention to contribute a truck of the class described adapted to lift and lower a part of a trailer or the like, the trailer to be adapted for movement with the truck when said part is lifted. One feature of my invention whereby the object thereof is attained, resides in the utilization of a truck adapted for movement on forward and rear wheels, with the feature that certain of the wheels are movable relatively to the truck so as to raise that end thereof by which the trailer is adapted to be supported and lifted.

As a further feature of this portion of the invention, I utilize means for mounting the movable or lifting wheels in straddling relation to the frame of the truck and for movement relatively thereto. As a further feature of the invention, the frame of the truck is U-shaped, the trailer part to be lifted being inserted between the legs of the U of the truck.

Still a further feature of the invention resides in the utilization of an inverted U member pivoted with its legs in straddling relation to the truck, and with wheels mounted on the ends of the legs of the U for contact with the ground. A still further feature of this part of the invention resides in the utilization of means for pivoting the inverted U member whereby to lift one end of the truck.

As a further feature of the invention, I utilize adaptors for accommodating my truck to trailers of different widths.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized by those skilled in the art as a basis for the designing of other structures for carrying out the several purposes of my invention. It is important, therefore, that the claims to be granted me shall be of sufficient breadth to prevent the appropriation of my invention by those skilled in the art.

Figure 8:
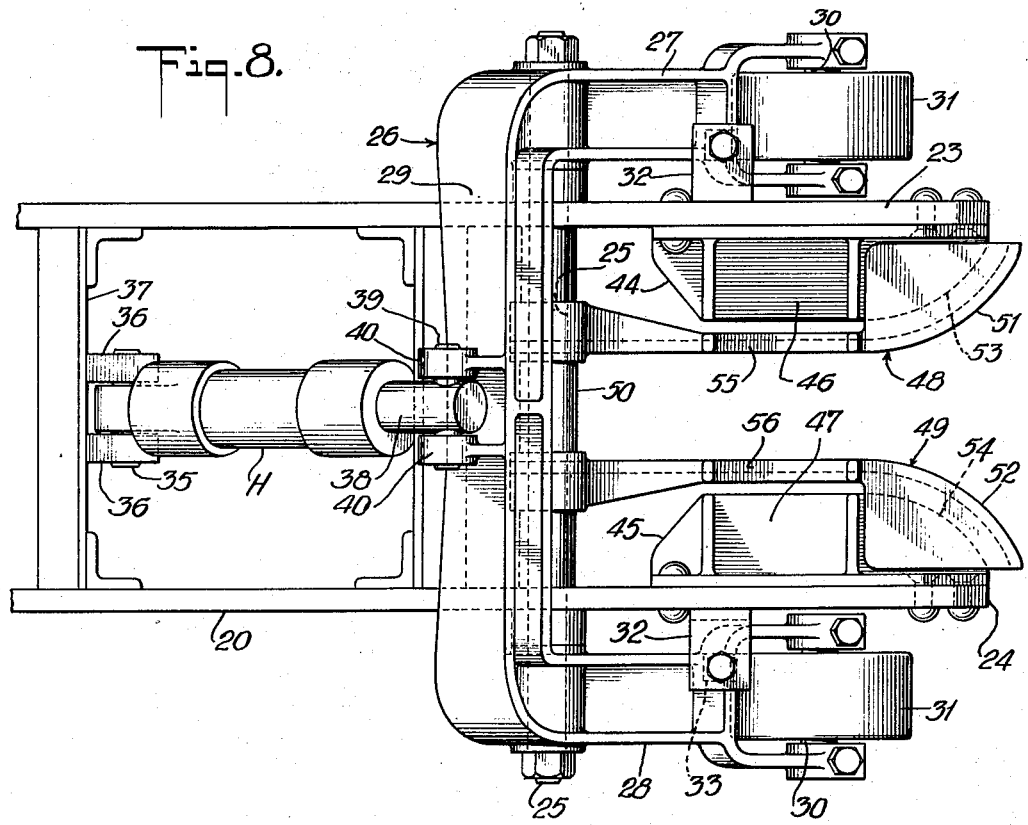
Figure 9:
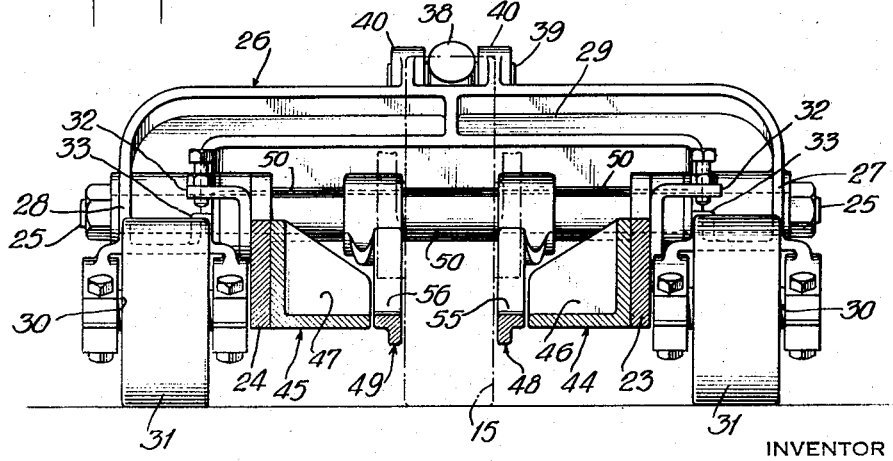

Referring now to the drawings, Fig. 1 illustrates my truck in lifting engagement with a trailer. Fig. 2 is an enlarged side elevation showing the truck in lowered position and about to engage the forward steering head of the trailer. Fig. 3 is a forward elevation showing the relation of the forward wheel of a trailer to the truck. Fig. 4 illustrates the relation of the lifting means of the truck to a wide forward trailer wheel mounting. Fig. 5 is a vertical section illustrating the relation of the truck to the forward trailer wheels when the same are in the position of Fig. 1. Fig. 6 is an isometric view of that part of the truck that is adapted to contact the steering head of the trailer. Fig. 7 is an isometric view of an adaptor for effecting the lifting of narrow wheel trailers of the type shown in Fig. 3. Fig. 8 is a plan view of the rear end of the lifting truck of my invention, while Fig. 9 is a view taken of Fig. 8 looking toward it from the right, with certain parts shown in sections.

Referring now more particularly to the drawings, reference letter T indicates generally a trailer of the type adapted for manipulation by the truck of my invention. Of course, my invention is capable of lifting other types of trailers and the particular type herein shown is merely one example. The trailer T has rear wheels 10, and pivoted to the forward end thereof is a steering head 11 adapted for rotation relatively to the trailer by a steering handle 12 best illustrated in Fig. 2. As is also best illustrated in Fig. 2, the steering head 11 comprises a bifurcated bracket 13 adapted for the mounting of a forward axle 14. In one form of trailer, the axle 14 will support a single forward steering wheel 15 as best illustrated in Fig. 3. In another form of truck the forward bifurcated bracket of the steering head will be formed as illustrated in Fig. 4, being there designated by reference numeral 13a. This bracket will support an axle 14a on which are mounted a pair of forward steering wheels 15a.

The truck of my invention is formed with a main frame 20 at the forward end of which is mounted a power steering and traction unit designated by the letter P. This unit is adapted to propel and steer the truck under the control of suitable means carried by the steering and controlling handle 21, the power being supplied by a battery 22 carried by the frame 20. For those who may wish to study the details of construction of the power unit P and its control, I make reference to my Patent No. 2,327,583 dated August 24, 1943. For the purposes of understanding the present invention, it is merely necessary to appreciate that the frame 20 is adapted for tractive movement in a manner that is now well known in this art, and that the traction wheel of power unit P does not move vertically relatively to the frame 20.

The frame 20 extends rearwardly as is best illustrated in Fig. 8, and preferably forms a U, with the legs of the U designated by reference numerals 23 and 24. Mounted on suitable bearings in the legs 23 and 24 is a shaft 25, the said shaft extending beyond each of the legs at each side of the truck. This shaft 25 is adapted to support what I term an inverted U member 26. This inverted U member 26 is pivotally mounted on shaft 25 as is clearly illustrated in the drawings, and has legs 27 and 28 extending downwardly toward the ground. Its base portion 29 is positioned substantially horizontally between the said legs 27 and 28 for a purpose to be indicated presently.

The legs 27 and 28 of member 26 are bifurcated at their lower ends for supporting axles 30 on which are mounted rear lifting wheels 31. A bracket 32 extends outwardly from each of the legs 23, 24 of the truck frame 20 and coacts with a limit surface 33 of each of the legs 27, 28 of the U member 26. In this way, the movement of the member 26 counter-clockwise relatively to the frame 20 is limited. This, as will be understood, limits the downward movement of the frame 20 relatively to the wheels 31 and the ground.

For rotating the inverted U member 26 on the shaft 25, I utilize a standard type of hydraulic ram H, whose cylinder portion is pivoted on shaft 35 to brackets 36 extending from a cross bar 37 that forms part of the frame 20. The piston 38 of the hydraulic ram H is pivoted through a shaft 39 to ears 40 that are integral with the base 29 of the inverted U member 26. A suitable hydraulic pump 41 carried by the frame 20 may be actuated by a foot treadle 42 whereby to supply fluid to the hydraulic ram H and thereby effect rotation of the inverted U member 26 from its position of Fig. 2 to its position of Fig. 5. Reverse movement of the member 26 is effected by a reverse movement of the piston 38 of the ram made possible by suitable control of the valve mechanism of the hydraulic ram H by a handle 43. The construction of the pump 41 and its control by the treadle 42 and the handle 43 is purely conventional, and is therefore not here described in detail. Those skilled in the art will readily understand just how this mechanism operates.

Secured to the opposed inner surfaces of the legs 23, 24 of the frame 20 are brackets 44 and 45, best illustrated in Figs. 6 and 8, Fig. 6 showing the bracket 44 that is secured to the leg 23. The brackets are formed with pockets 46, 47 adapted for coaction with the legs of the bifurcated bracket 13a of the trailer T as best illustrated in Fig. 4. Thus, with the frame 20 in its lowered position of Fig. 2, the truck is maneuvered to bring its legs 23, 24 in straddling relation to the forward end of the trailer T, and with the pockets 46, 47 of the brackets 44, 45 under the bifurcated bracket 13a of the steering head of the trailer. Now, upon actuation of the hydraulic ram H, the rear end of the truck frame 20 is raised as is illustrated in Fig. 5, effecting a lifting of the forward end of the trailer T. The truck may then act as a tractor to move the trailer to any desired position. Thereafter, actuation of the handle 43 will allow a lowering of the truck frame 20 to deposit the forward wheels 15a of the trailer T against the ground.

As shown in Fig. 3, trailers sometimes are equipped with steering heads having narrow bifurcated brackets 13 for the support of a narrow wheel 15. For handling trailers of this class, my truck is equipped with adaptors 48 and 49 mounted for rotation on the shaft 25 and spaced thereon by sleeves 50. The adaptor 48 is probably best illustrated in Fig. 7 and is also well shown in Figs. 5 and 8. When the truck is used with a trailer of the type described with reference to Fig. 4, the adaptors 48, 49 are in the dotted line position of Fig. 5. However, when it is desired to lift a truck having a narrow steering head of the type shown in Fig. 3, the adaptors 48, 49 are moved into the solid line position of Fig. 5, this being the position illustrated also in Figs. 8 and 9. In this position of the adaptors, their shelves 51 and 52 overlie shelf portions 53 and 54 of the brackets 44 and 45 and are thus supported for operation. When thus supported, the pockets 55 and 56 of the adaptors 48, 49 lie in position to engage the legs of the narrow bifurcated bracket 13 of the trailer steering head 11. It is, of course, obvious that actuation now of the hydraulic ram assembly H will act to lift and lower the trailer as was earlier described in connection with Fig. 4.

I believe that the great simplicity and extreme effectiveness of my invention will now be understood by those skilled in the art.

I now claim:

1. In a truck of the class described, a main frame, a forward support wheel mounted on the forward end of said main frame, the rear of said frame forming the legs of a U between which may be inserted the forward portion of a trailer, an inverted U frame, means pivoting said inverted U frame on said main frame with its legs straddling the U of said main frame and directed downwardly toward the ground, a wheel mounted on each of said downwardly main frame straddling legs, and means extending between said inverted U frame and said main frame for rotating said inverted U frame and its wheels relatively to said main frame to raise and lower the rear end of said main frame.

2. In a truck of the class described, a main frame, a forward support wheel mounted on the forward end of said main frame, the rear of said frame forming the legs of a U between which may be inserted the forward portion of a trailer, an inverted U frame, means pivoting said inverted U frame on said main frame with its legs straddling the U of said main frame and directed downwardly toward the ground, a wheel mounted on each of said downwardly directed main frame straddling legs, means extending between said inverted U frame and said main frame for rotating said inverted U frame and its wheels relatively to said main frame to raise and lower the rear end of said main frame about the forward support wheel as a fulcrum, and means on said main frame for lifting the end of a trailer placed between the legs of said main frame.

3. In a truck of the class described, a main frame, a forward support wheel mounted on the forward end of said main frame, the rear of said frame forming the legs of a U between which may be inserted the forward portion of a trailer, an inverted U frame, means pivoting said inverted U frame on said main frame with its legs straddling the U of said main frame and directed downwardly toward the ground, a wheel mounted on each of said downwardly directed main frame straddling legs, means extending between said inverted U frame and said main frame for rotating said inverted U frame and its wheels relatively to said main frame to raise and lower the rear end of said main frame about the forward support wheel as a fulcrum, and means formed on the inside of each of the legs of said main frame for lifting the end of a trailer placed therebetween.

4. In a truck of the class described, a main frame, a forward support wheel mounted on the forward end of said main frame, the rear of said frame forming the legs of a U between which may be inserted the forward portion of a trailer, an inverted U frame, means pivoting said inverted U frame on said main frame with its legs straddling the U of said main frame and directed downwardly toward the ground, a wheel mounted on each of said downwardly directed main frame straddling legs, means extending between said inverted U frame and said main frame for rotating said inverted U frame and its wheels relatively to said main frame to raise and lower the rear end of said main frame about the forward support wheel as a fulcrum, trailer lift means, and pivots supporting said trailer lift means on said main frame for movement into position between the legs of said main frame for lifting the end of a trailer placed therebetween.

5. In a truck of the class described, a main frame, a forward support wheel mounted on the forward end of said main frame, an inverted U frame, means pivoting said inverted U frame on said main frame with its legs straddling the said main frame and directed downwardly toward the ground, a wheel mounted on each of said downwardly directed main frame stradding legs, and means extending between said inverted U frame and said main frame for rotating said inverted U frame and its wheels relatively to said main frame to raise and lower the rear end of said main frame about the forward support wheel as a fulcrum.

6. In a truck of the class described, a main frame, a forward support wheel mounted on the forward end of said main frame, an inverted U frame, means pivoting said inverted U frame on said main frame with its legs straddling the said main frame and directed downwardly toward the ground, a wheel mounted on each of said downwardly directed main frame straddling legs, means extending between said inverted U frame and said main frame for rotating said inverted U frame and its wheels relatively to said main frame to raise and lower the rear end of said main frame about the forward support wheel as a fulcrum, and means on said main frame for lifting the end of a trailer.

7. In a truck of the class described, a main frame, a forward support wheel mounted on the forward end of said main frame, the rear of said frame forming the legs of a U between which may be inserted the forward portion of a trailer, a lift wheel lever rotatably mounted on the rear of said main frame at each side thereof whereby said levers straddle said main frame, a lift wheel mounted at the end of each of said levers and adapted for contact with the ground, and means extending between said levers and said main frame for rotating said levers relatively to said main frame to raise and lower the rear end of said main frame about the forward support wheel as a fulcrum.

8. In a truck of the class described, a main frame, a forward support wheel mounted on the forward end of said main frame, the rear of said frame forming the legs of a U between which may be inserted the forward portion of a trailer, a lift wheel lever movably mounted on the rear of said main frame at each side thereof whereby said levers straddle said main frame, a lift wheel mounted at the end of each of said levers and adapted for contact with the ground, and means extending between said levers and said main frame for moving said levers relatively to said main frame to raise and lower the rear end of said main frame about the forward support wheel as a fulcrum.

9. In a truck of the class described, a main frame, a forward support wheel mounted on the forward end of said main frame, the rear of said frame forming the legs of a U between which may be inserted the forward portion of a trailer, a lift wheel lever pivoted on the rear of said main frame at each side thereof whereby said levers straddle said main frame, a lift wheel mounted at the end of each of said levers and adapted for contact with the ground, means extending between said levers and said main frame for rotating said levers relatively to said main frame to raise and lower the rear end of said main frame about the forward support wheel as a fulcrum, and means on said main frame for lifting the end of a trailer placed between the legs of said main frame.

10. In a truck of the class described, a main frame, a forward support wheel mounted on the forward end of said main frame, the rear of said frame forming the legs of a U between which may be inserted the forward portion of a trailer, a lift wheel lever pivoted on the rear of said main frame at each side thereof whereby said levers straddle said main frame, a lift wheel mounted at the end of each of said levers and adapted for contact with the ground, means extending between said levers and said main frame for rotating said levers relatively to said main frame to raise and lower the rear end of said main frame about the forward support wheel as a fulcrum, and means formed on the inside of each of the legs of said main frame for lifting the end of a trailer placed therebetween.

11. In a truck of the class described, a frame formed in the shape of a U for the insertion of a part of a trailer between the legs of the said U, means for lifting the legs of the U to engage and lift the said part of the trailer, a surface fixed on the inside surface of each leg of the U for engaging the said part of the trailer, additional trailer part lift means, and pivots mounting said additional trailer part lift means on said frame for movement into and out of superimposed relation to said surfaces.

12. In a truck of the class described, a frame formed in the shape of a U for the insertion of a part of a trailer between the legs of the said U, means for lifting the legs of the U to engage and lift the said part of the trailer, a surface fixed on the inside surface of each leg of the U for engaging the said part of the trailer, additional trailer part lift means, and pivots mounting said additional trailer part lift means on said frame for movement into and out of position between the legs of said U for engagement with said trailer, said additional trailer lift means forming adaptors to coact with said trailer where said surfaces are ineffective for cooperation with said part.

13. In a truck of the class described, a lifting frame, a pair of opposed surfaces on said lifting frame adapted to be placed under a part of a trailer for engaging said part to lift said trailer, additional trailer part lift means, and pivots mounting said additional trailer part lift means on said frame for movement into and out of position between said surfaces for engagement with said trailer, said additional trailer lift means forming adaptors to coact with said trailer where said surfaces are ineffective for cooperation with said part.

HERBERT J. FRAMHEIN.

REFERENCES CITED

The following references are of record in the file of this patent:

UNITED STATES PATENTS

| Number | Name | Date |
|---|---|---|
| 1,223,505 | Martin | Apr. 24, 1917 |
| 2,059,205 | Buffington | Nov. 3, 1936 |
| 2,178,647 | Raymond | Nov. 7, 1939 |
| 2,372,585 | Klumb et al. | Mar. 27, 1945 |